United States Patent [19]

Doyon et al.

[11] Patent Number: 4,587,946

[45] Date of Patent: May 13, 1986

[54] MOBILE BAKING OVEN AND PROOFER

[76] Inventors: Jacques Doyon, 10e rue ouest, St-Côme, Beauce, Quebec; Maurice Doyon, 850, 15e rue ouest, St-Georges, Beauce, Quebec, both of Canada

[21] Appl. No.: 697,446

[22] Filed: Feb. 1, 1985

[51] Int. Cl.⁴ .............................................. A21B 1/08
[52] U.S. Cl. ................... 126/20; 126/21 A; 34/196; 34/198; 99/339; 99/474; 165/919; 219/393; 219/400; 219/401; 312/236; 426/523
[58] Field of Search .................... 126/19 M, 20, 21 A; 312/236; 99/467, 468, 474, 483, 484, 339; 165/DIG. 25, DIG. 26; 34/50, 196, 198; 219/386, 400, 401, 407, 393; 426/418, 510, 419, 523; 432/199, 203

[56] References Cited

U.S. PATENT DOCUMENTS

| | | | |
|---|---|---|---|
| 3,518,949 | 7/1970 | Stock | 99/468 X |
| 3,820,524 | 6/1974 | Buckell | 126/20 |
| 4,010,345 | 3/1977 | Lee | 219/401 |
| 4,011,805 | 3/1977 | Vegh et al. | 99/474 X |
| 4,237,623 | 12/1980 | Timm et al. | 34/196 |
| 4,244,979 | 1/1981 | Roderick | 126/21 A X |
| 4,484,063 | 11/1984 | Whittenburg et al. | 126/21 A X |
| 4,506,598 | 3/1985 | Meister | 126/20 X |
| 4,516,012 | 5/1985 | Smith et al. | 126/21 A X |

FOREIGN PATENT DOCUMENTS 2475854  8/1981  France ............................ 126/19 M Primary Examiner—Margaret A. Focarino
Attorney, Agent, or Firm—Oblon, Fisher, Spivak, McClelland & Maier

[57] ABSTRACT

A baking oven comprising a housing having a proofer compartment and a baking compartment. Doors are provided for access to the compartment. Support racks are disposed in the compartments for supporting dough products therein. A heating element and conduit are associated with the proofer compartment for recirculating hot humid air therein. The baking compartment has a rear wall supported in spaced relationship to interior surfaces of the baking compartment to define an outer circumferential convection opening thereabout. An air intake port is provided in the rear wall and an impeller fan draws air through the intake port and directs it through heating elements and then expels it through the circumferential opening forwardly of the rear wall creating a recirculated heated air flow distributed through the baking compartment.

9 Claims, 6 Drawing Figures

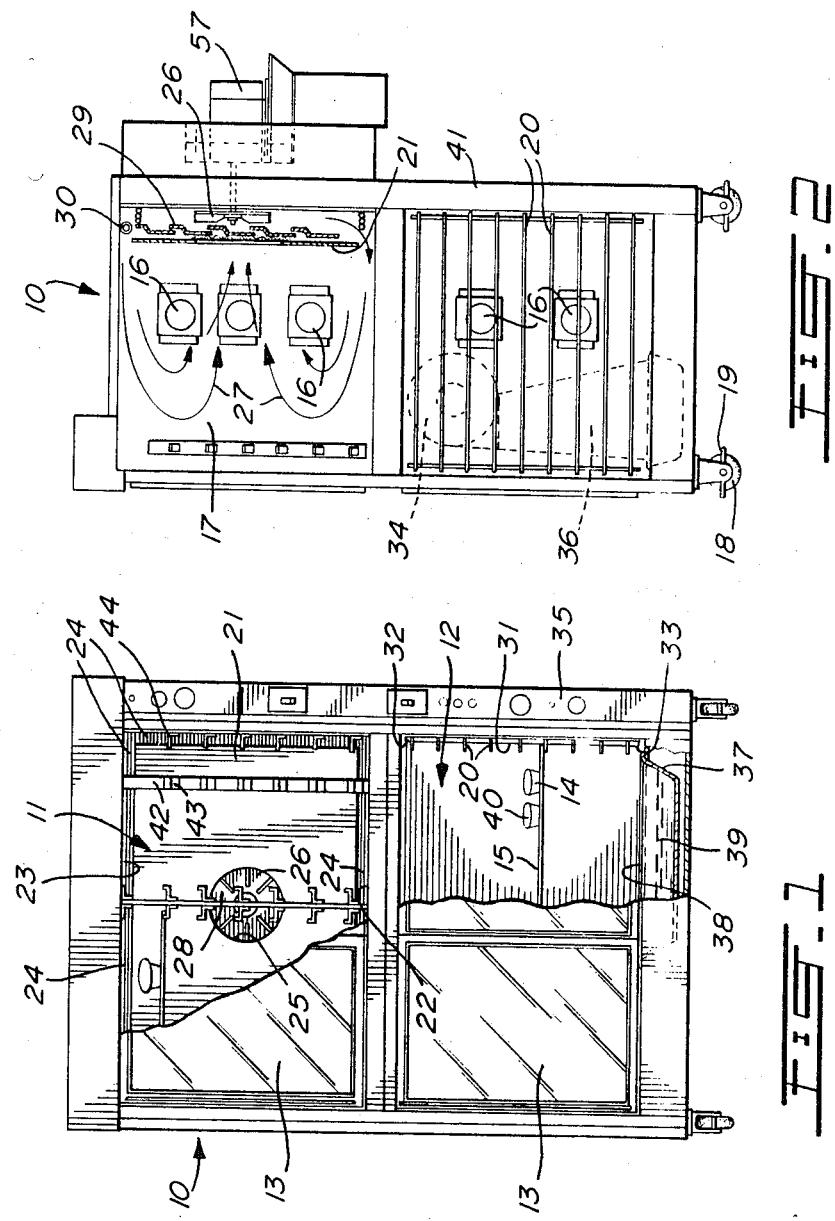

U.S. Patent   May 13, 1986   Sheet 2 of 2   4,587,946
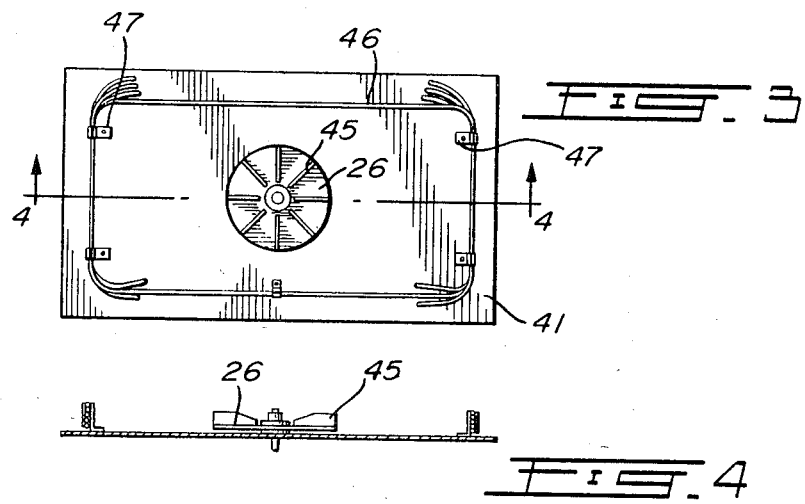
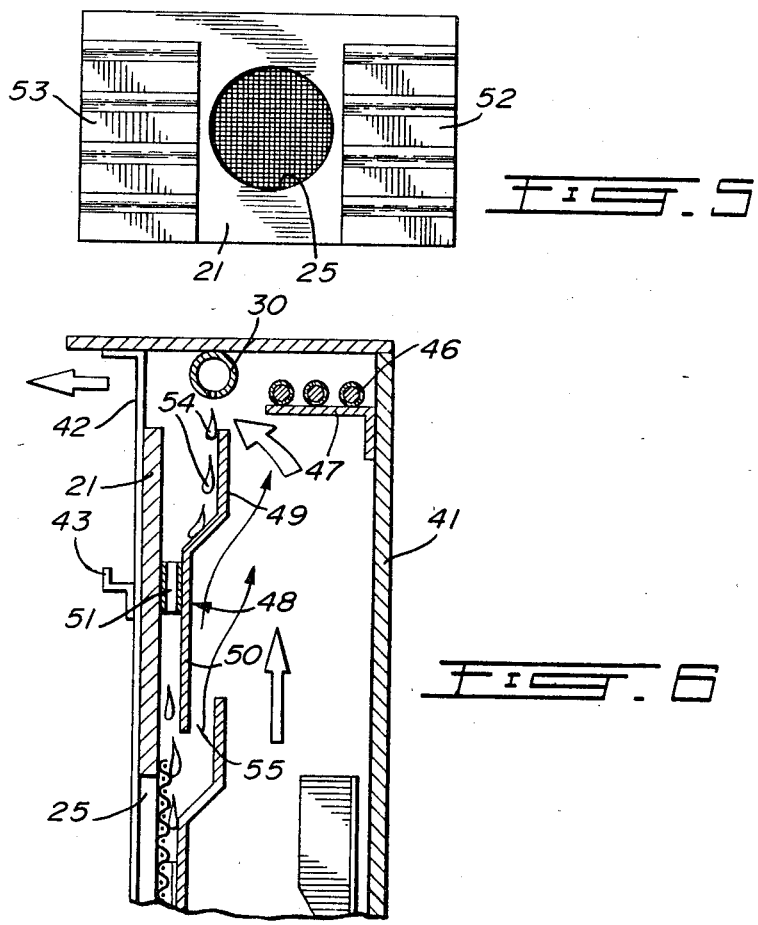

MOBILE BAKING OVEN AND PROOFER

BACKGROUND OF THE INVENTION (a) Field of the Invention

The present invention relates to an improved baking oven which comprises a baking compartment and a proofer compartment separated from one another and wherein hot air is recirculated in the baking compartment in an improved fashion whereby to reduce baking time.

(b) Description of Prior Art

Baking ovens have been known for many years but more recently there has been developed a market to provide small baking ovens having a baking and a proofer compartment. These ovens are usually mobile and take very little space in a small convenience store. The proofer oven is required whereby to subject the baking dough to heating and humidity to make the dough rise. Once the dough has risen, the trays containing the dough are moved from the proofer compartment to the baking compartment where they are subjected to heat. However, because of the small size of these ovens, it has been very difficult to provide uniform and sufficient hot air to uniformly bake the dough products within relative short time. These ovens are usually loaded and unloaded several times during the course of a day.

SUMMARY OF INVENTION

It is a feature of the present invention to provide an improved baking oven wherein the baking compartment is capable of recirculating and heating hot air and distribute the hot air throughout the baking compartment whereby to achieve substantially uniform baking throughout the compartment.

Another feature of the present invention is to provide a baking oven wherein the baking time of the baking compartment is substantially reduced as compared to similar types of baking ovens and wherein the housing is compact and provides visual access to the baking products in the proofer and baking compartments.

Another feature of the present invention is to provide a baking oven wherein there is provided a vapor producing element associated with the hot air convection flow whereby to glaze the surface of the baked products during their final baking cycle.

Another feature of the present invention is to provide a baking oven wherein the air convection flow is generated by an impeller fan which is cycled to rotate in opposed directions whereby to provide a uniform baking substantially throughout the baking oven.

According to the above features, from a broad aspect, the present invention provides a baking oven comprising a housing having a proofer compartment and a baking compartment. Doors are provided for access to the compartments. Support means is provided inside the compartments for supporting dough products therein. Heating and convection means are associated with the proofer compartment together with a moisture producing means which is disposed in communication with a hot air current whereby to cause the dough products to rise. The baking compartment has a rear wall supported in spaced relationship to interior surfaces of the baking compartment to define an outer circumferential convection opening thereabout. An air intake port is provided in the rear wall. An impeller fan is mounted behind the rear wall. Heating means is positioned about the fan for heating air drawn through the intake port and expelled through the circumferential opening forwardly of the rear wall creating a recirculated heated air flow distributed through the baking compartment.

BRIEF DESCRIPTION OF DRAWINGS

A preferred embodiment of the present invention will now be described with reference to the example thereof as illustrated in the accompanying drawings, in which:

FIG. 1 is a fragmented front view of the baking oven;

FIG. 2 is a fragmented side view of the baking oven;

FIG. 3 is a plan view of the back wall of the baking compartment illustrating the disposition of the heating elements relative to the impeller fan;

FIG. 4 is a cross-section view along cross-section lines IV of FIG. 3;

FIG. 5 is a plan view of the rear surface of the rear wall supported forwardly of the back wall; and FIG. 6 is a fragmented cross-section view showing the disposition of the backing wall and the rear wall and the operation of the moisture producing means associated with the baking compartment.

DESCRIPTION OF PREFERRED EMBODIMENTS

Referring now to the drawings and more particularly to FIGS. 1 and 2, there is shown generally at 10 the baking oven of the present invention. The oven is a substantially rectangular housing and comprises a baking compartment 11 and a proofer compartment 12. Sliding glass doors 13 are provided for access to these compartments to place baking trays 13 on support shelves 15 provided therein and also provide visual access to the trays and the baking dough during the heating or baking cycles.

Each of the compartments is provided with lights 16 in the side walls 17 thereof to illuminate the compartment when required. Also, the housing is supported on casters having locking brackets 19 whereby to displace the oven over a support surface and lock it into place. The support shelves 15 in the proofer compartment 12 are supported by side wall brackets 20 which are closely spaced apart whereby to support the shelves 15 thereon.

It can be seen that the oven compartment 11 is provided with a rear wall 21 which is supported in spaced relationship to the interior surfaces of the side walls 17 and the bottom and top walls 22 and 23, respectively, whereby to define an outer circumferential convection opening 24 thereabout. An air intake port 25 is disposed substantially centrally of the rear wall 21 and an impeller fan 26 is mounted in spaced relationship behind the opening 25 whereby to draw air through the intake port 25 and expel it through the circumferential opening 24 forwardly of the rear wall to create a recirculated heated air flow distributed throughout the baking compartment as illustrated by the convection arrows 27 in FIG. 2. A meshing 28 is disposed over the air intake port 25 to prevent access to the fan 26 to protect it against accidental contact with foreign objects.

As shown in FIG. 2, a moisture producing means in the form of a metal wall 29 and drip pipe 30 is provided rearwardly of the rear wall 21 and is in contact with the circulated heated air flow whereby to release steam within the air flow. This moisture producing means is provided for adding moisture to the hot air at the end of the baking cycle whereby to glaze the surface of the baked dough when required to do so.

The proofer compartment 12 is of a substantial rectangular configuration and is provided with a convection side wall 31 having a top inlet opening 32 and a bottom outlet opening 33. A motor driven fan 34 is mounted in the hollow side wall 35 of the housing and has a duct 36 which communicates the inlet 32 with the outlet 33 through the fan 34. A moisture producing means in the form of a water tray 37 is located in the bottom wall 38 of the proofer compartment whereby the water 39 therein will evaporate and release moisture within the recirculating hot air flow from the outlet 33 to the inlet 32 of the convection side wall 31. A suitable heating element (not shown) is located behind the side wall 31 and within the duct 36 with the air passing therethrough. The purpose of the proofer compartment 15 is to cause the dough 40 located in the trays 14 to rise prior to placing same in the baking compartment 11.

Referring now additionally to FIGS. 3 and 6, there is shown the construction of the rear wall 21 and its position relative to the back wall 41 of the housing. The rear wall 21 is a rectangular wall which is supported spaced from the inner wall of the baking compartment by vertical braces 42 having positioned thereon support brackets 43 which are aligned with side wall brackets 44 to support trays thereacross. As herein shown, the baking compartment is divided into two shelf supporting sections but may be comprised as a single shelf supporting section extending across the compartment.

The fan 26 as shown is comprised of a circular disc having a plurality of radially spaced apart fan blades 45 whereby to create a suction force through the air inlet port 25. A heating element in the form of a plurality of windings of a heating resistive element 46 is supported behind the rear wall on the back wall 42 by means of support brackets 47. The moisture producing means, as before described, is herein shown in detail as being formed by a plurality of horizontal metal plates 48 having an outwardly bent upper horizontal flange end section 49 and a drip wall section 50. The plates are spaced from a rear surface of the rear wall 21 by spacing brackets 51 and supported in non-obstructing relationship to the air intake port, as is clearly shown in FIG. 6. In fact, there are two side sections 52 and 53 of these plates located on each side of the air intake port 25. The drip pipe 30 is positioned longitudinally above a top one of the plates for dripping water droplets 54 on the back wall of the flange end section 49. As herein shown, the plates are secured in a common plane and have their flange end sections 49 overlapping a lower edge portion of the drip wall 50 of a preceding plate and defines a steam release opening 55 therebetween. As the water droplets flow down the back wall of the plates 48, some of these will evaporate and release steam 56 into the convection hot air stream. Of course, as previously described, this moisture producing means is active only towards the end of the baking cycle, at which time the plates 48 have been heated considerably due to the recirculating hot air passing thereagainst.

The fan 26 is connected to a fan motor 57 having a reverse drive cycle whereby to drive the fan 26 in alternating clockwise and counter-clockwise directions. In this specific embodiment, the motor is operative for 2½ minutes in one direction then stalls for 5 seconds and operates again for 2½ minutes in the reverse direction. This cycle is repeated several times during the baking process.

With this improved baking oven, a loaf of bread can be baked in approximately 28 minutes as opposed to the 50 minutes usually required in conventional ovens. Also, controls are conveniently located on a side edge portion of the front wall to regulate the cooking cycles and the dough rising cycle and to operate the lights and perform other control functions of the oven. However, it is pointed out that the improvement in the baking compartment is achieved by the novel construction of the back wall with the position of the air intake port and the circumferential convection opening about the rear wall whereby to create an annulus like hot air recirculation stream which is periodically reversed and distributes heat throughout the baking compartment.

It is within the ambit of the present invention to cover any obvious modifications of the example of the preferred embodiment described herein, provided such modifications fall within the scope of the appended claims.

We claim:

1. A baking oven comprising a housing having a proofer compartment and baking compartment, doors for access to said compartments, support means for supporting dough products in said compartments, heating and convection means associated with said proofer compartment, moisture producing means associated with said proofer compartment in communication with a hot air current generated by said heating and convection means, said baking compartment having a rear wall supported in spaced relationship to interior surfaces of said baking compartment to define an outer circumferential convection opening thereabout, an air intake port in said rear wall, an impeller fan behind said rear wall, heating means positioned about said fan for heating air drawn through said intake port and expelled through said circumferential opening forwardly of said rear wall creating a recirculated heated air flow distributed through said baking compartment, a metal wall and a drip pipe positioned above the metal wall for releasing water thereon after said wall has been heated whereby to produce steam which is released in said recirculated heated air flow, said metal wall being formed by a plurality of horizontal metal plates having an outwardly bent upper horizontal flanged end and drip wall, said plates being spaced from a rear surface of said rear wall in non-obstructing relationship to said air intake port, said drip pipe extending longitudinally above a top one of said plates for releasing water droplets on said flange end, said plates being secured in a common plane and having their flanged end overlapping a lower edge portion of the drip wall of a preceding plate and defining a steam release opening therebetween.

2. A baking oven as claimed in claim 1 wherein said air intake port is positioned centrally in said rear wall whereby there is created an annulus air flow forwardly of said rear wall for substantially uniform baking in said baking compartment.

3. A baking oven as claimed in claim 2 wherein said impeller fan has a plurality of impeller blades disposed in a common vertical plane and disposed in alignment with said air intake port, said fan being connected to a motor having a reversing drive cycle whereby to drive said fan in alternating clockwise and counter-clockwise directions.

4. A baking oven as claimed in claim 1 wherein said heating means comprises a plurality of windings of a heat generating resistive element supported behind said rear wall intermediate said fan and said circumferential convection opening.

5. A baking oven as claimed in claim 1 wherein said heating and convection means is a recirculating fan mounted in a side wall of said proofer compartment, said side wall having a top inlet opening communicating with said recirculating fan, said fan having a duct communicating with a bottom outlet opening in said side wall, said moisture producing means communicating with a recirculated air stream adjacent said outlet opening.

6. A baking oven as claimed in claim 5 wherein said moisture producing means is a water tray provided in a bottom wall of said proofer compartment adjacent said outlet opening.

7. A baking oven as claimed in claim 4 wherein there is further provided control means to control the temperature, baking time and moisture of both said compartments.

8. A baking oven as claimed in claim 7 wherein said compartments are rectangular compartments, said rear wall being a rectangular plate, said support means being removable shelves supported in said compartments, said doors having glass panes for visual access to said compartments, and lights mounted in the side walls of said compartments.

9. A baking oven as claimed in claim 8 wherein said housing is a substantially rectangular mobile housing mounted on lockable wheels.

* * * * *